United States Patent
Banba et al.

(10) Patent No.: US 7,160,611 B2
(45) Date of Patent: Jan. 9, 2007

(54) PRESSURE SENSITIVE ADHESIVE OPTICAL FILM AND IMAGE VIEWING DISPLAY

(75) Inventors: Tomohide Banba, Ibaraki (JP);
Yoshihiro Minamizaki, Ibaraki (JP);
Masayuki Satake, Ibaraki (JP);
Katsuhiko Kamiya, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 125 days.

(21) Appl. No.: 10/413,636

(22) Filed: Apr. 14, 2003

(65) Prior Publication Data

US 2003/0198807 A1    Oct. 23, 2003

(30) Foreign Application Priority Data

Apr. 18, 2002    (JP)    ............... 2002-115895

(51) Int. Cl.
*B32B 7/12*    (2006.01)
*B32B 7/02*    (2006.01)
*B32B 15/04*    (2006.01)
*G02B 1/10*    (2006.01)

(52) U.S. Cl. ............. 428/343; 428/354; 428/355 AC; 427/208.8

(58) Field of Classification Search ........ 428/343, 428/355 AC, 354; 427/208.8
See application file for complete search history.

(56) References Cited

U.S. PATENT DOCUMENTS 6,103,302 A    8/2000   Minamizaki et al.
2003/0198807 A1*  10/2003  Banba et al. ............ 428/343

FOREIGN PATENT DOCUMENTS

WO    WO 01/37007   *  5/2001

* cited by examiner

*Primary Examiner*—Daniel Zirker
(74) *Attorney, Agent, or Firm*—Knobbe Martens Olson & Bear LLP

(57) ABSTRACT

A pressure sensitive adhesive optical film with a pressure sensitive adhesive layer laminated on at least one surface of an optical film, wherein the pressure sensitive adhesive layer has a value of no more than 5 N/25 mm for a $P_0$ which is initial 90° peel strength at 23° C. and by a peeling speed of 300 mm/minute after an autoclave processing under a condition of 50° C.×5 atm×15 minutes, and a ratio ($P_1/P_0$) of a $P_1$ to a $P_0$ is no less than 2, which $P_1$ is 90° peel strength after heating by a peeling speed of 300 mm/minute and at 23° C. after the pressure sensitive adhesive layer is given the above-mentioned autoclave processing and is furthermore given a heat-treatment at 80° C. for 2 hours.

5 Claims, 1 Drawing Sheet

PRESSURE SENSITIVE ADHESIVE OPTICAL FILM AND IMAGE VIEWING DISPLAY

BACKGROUND OF THE INVENTION

1. Field of the Invention

The present invention relates to a pressure sensitive adhesive optical film having a pressure-sensitive adhesive layer laminated on at least one surface of the optical film. Specifically, it relates to an image viewing display using the pressure sensitive adhesive optical film, such as a liquid crystal display, an organic electro luminescence display, a PDP, and a CRT. As the optical film, an optical film obtained by laminating a polarizing film, a retardation film, an optical compensating film, a brightness enhanced film, and an antiglare sheet etc. may be mentioned.

2. Description of the Related Art

Conventionally, as optical films for liquid crystal displays (LCD), for example, a polarizing film, a retardation film, or an elliptical polarization film obtained by lamination thereof has been known. These optical films are used as a pressure sensitive adhesive optical film in which pressure sensitive adhesive layers, such as acrylic pressure sensitive adhesive layer, are beforehand formed for attachment on a liquid crystal cell, for the purpose of increase in efficiency of LCD assembly, prevention of variation in quality, etc.

In the above-mentioned pressure sensitive adhesive optical films, it is required to be excellent in (1) reworkability (reproduction property): a property of reworking that an optical film can be peeled from a liquid crystal cell in case of wrong positioning in attaching or of admixing of foreign matter into laminated face in a process of attachment of a film to a liquid crystal cell, and (2) moisture heat resistance of forming neither foaming nor peeling before and after being heat-treated in a state where it is mounted in an LCD. Recently, requirement for the above-mentioned performance has become higher in accordance with performance upgrading and upsizing of LCDs, leading to demand for improvement in durability sustaining still severer conditions. Moreover, since cost of a liquid crystal cell also increases in accordance with performance upgrading and upsizing of an LCD, demands for the reworkability (1) of an optical film enabling reproduction of an expensive liquid crystal cell are further increasing.

In conventional pressure sensitive adhesive optical films, in order to improve moisture heat resistance (2) in a state where it is mounted in an LCD, a measure of improving adhesive property between a pressure sensitive adhesive layer and a glass plate has been adopted. However, adhesive improvement in pressure sensitive adhesive layer increases a peeling force at time of removing an optical film from a liquid crystal cell. Therefore, a discrepancy causing damage of a glass plate for an LCD itself in case of reworking easily occurs, thus leading to deterioration in reworkability (1). Moreover, there is a tendency of decreasing in thickness of a glass plate of an LCD, which makes the glass plate more easily broken. On the other hand, design of a pressure sensitive adhesive layer placing a premium on a function of reworkability (1) worsens the moisture heat resistance (2). That is, reworkability (1) and moisture heat resistance (2) are in a relationship of trade-off.

Furthermore, in a pressure sensitive adhesive optical film, it is required to be excellent in (3) optical function retentivity that neither transmittance of light nor an optical property of retardation (a retardation value: a product of a refractive-index difference Δn of birefringence and a film thickness d) etc. falls even after kept in a high temperature ambient atmosphere. However, in general, there is a tendency that adhesive power improvement in a pressure sensitive adhesive layer for improving the moisture heat resistance (2) raises an elastic modulus of the pressure sensitive adhesive layer. And, improvement in an elastic modulus causes thermal expansion difference between adherends, such as liquid crystal cell, etc., and then increase of a stress of an optical film, which deteriorates optical function retentivity (3), as a result causes deterioration of an optical property of the optical film by heating. Especially when a liquid crystal cell is kept in a high temperature ambient atmosphere, display irregularity will arise on periphery of the liquid crystal cell. On the other hand, although the display irregularity on the periphery shows a tendency of being improved by lowering an elastic modulus of the pressure sensitive adhesive layer, in that case, moisture heat resistance (2) decreases.

SUMMARY OF THE INVENTION

The present invention aims at providing a pressure sensitive adhesive optical film that has excellent reworkability, moreover moisture heat resistance, and gives neither foaming nor peeling under a heated and humidified processing. And moreover, the present invention aims at providing a pressure sensitive adhesive optical film that has excellent reworkability, and moisture heat resistance, and that has outstanding optical function retentivity and gives no display irregularity on periphery even in a high temperature ambient atmosphere. Furthermore, the present, invention aims at providing a pressure sensitive adhesive for optical films for use of the pressure sensitive adhesive optical film concerned, and an image viewing display using the pressure sensitive adhesive optical film concerned.

As a result of wholehearted research made by the present inventors in order to solve the above-mentioned problems, it was found out that the above-mentioned object might be attained using a following pressure sensitive adhesive optical film, thus leading to completion of the present invention.

That is, the present invention is a pressure sensitive adhesive optical film with a pressure sensitive adhesive layer laminated on at least one surface of an optical film, wherein $P_0$ gives a value of no more than 5 N/25 mm, (where the pressure sensitive adhesive layer is attached on a glass plate, it is given autoclave processing under a condition of 50° C.×5 atm×15 minutes, is left in 23° C. ambient atmosphere for 30 minutes, and subsequently, the $P_0$ of initial 90° peel strength at 23° C. and by a peeling speed of 300 mm/minute is determined), and a ratio ($P_1/P_0$) of a $P_1$ to a $P_0$ is no less than 2 (where after the pressure sensitive adhesive layer is given the above-mentioned autoclave processing, it is furthermore given a heat-treatment at 80° C. for 2 hours, subsequently, it is left in 23° C. ambient atmosphere for 30 minutes, and the $P_1$ of 90° peel strength after heating by a peeling speed of 300 mm/minute and at 23° C. is determined).

After a pressure sensitive adhesive optical film is attached onto a liquid crystal cell, in general, an autoclave processing is given. Although conditions of the autoclave processing are not especially limited, usually, conditions of temperatures in a range of room temperature through 60° C., pressures in a range of 2 atm through 10 atm, and period in a range of 5 minutes through 60 minutes are preferably adopted. In particular, conditions of temperatures in a range of 40° C. through 60° C., pressures in a range of 4 atm through 6 atm, and period in a range of 10 minutes through 20 minutes are more preferably used. In the present invention, a case is adopted as a standard where a general condition of 50° C.×5 atm×15 minutes is adopted as an autoclave processing condition, and thereby a 90° peel strength after the autoclave processing is limited. In addition, measuring condition of 90° peel strength is "at 23° C., and by a peeling speed of 300 mm/minute", and detailed conditions are described in Examples.

An initial 90° peel strength $P_0$ immediately after an autoclave processing is no more than 5 N/25 mm. The initial 90° peel strength $P_0$ is preferably no more than 4N/25 mm, and more preferably no more than 3 N/25 mm. When the in initial 90° peel strength $P_0$ is no more than 5 N/25 mm, an adhesive strength immediately after an autoclave processing shows a moderately small value, and the moderately small adhesive strength enables temporary attachment. And it offers outstanding workability at the time of re-peeling, and fully offers good reworkability avoiding damage to a liquid crystal cell after peeling. In addition, as a moderate adhesive strength immediately after an autoclave processing, an initial 90° peel strength $P_0$ is no less than 0.1 N/25 mm, and further is preferably no less than 0.5 N/25 mm.

A ratio ($P_1/P_0$) of a 90° peel strength $P_1$ after heat-treatment at 80° C. for 2 hours is given following the autoclave processing, to the $P_0$ is no less than 2. The ratio ($P_1/P_0$) is preferably no less than 3, and more preferably no less than 4. When the ratio ($P_1/P_0$) is no less than 2, adhesive strength is improved after heat-treatment, which provides satisfactory moisture heat resistance. In order to satisfy the moisture heat resistance, the 90° peel strength $P_1$ after heating is preferably no less than 10 N/25 mm, and more preferably is no less than 15 N/25 mm.

In the pressure sensitive adhesive optical film, it is preferable that a shift distance in a creep test gives no less than 100 μm. Here, the creep test is performed by following methods:

a pressure sensitive adhesive layer is attached by an attachment area 10 mm×10 mm to a glass plate, subsequently, 4.9N load is applied in a shear direction in a 23° C. ambient atmosphere for 1 hour, and a shift distance of the pressure sensitive adhesive layer observed at this time is measured.

A magnitude of a shift distance in the creep test probably has a correlation to a magnitude of an elastic modulus of the pressure sensitive adhesive layer. If a shift distance in the creep test becomes small, generally an elastic modulus of the pressure sensitive adhesive layer will become higher, and therefore, increase in the elastic modulus causes increase of a stress of the optical film induced by a thermal expansion difference with adherends, such as a liquid crystal cell, etc., which generates display irregularity on a liquid crystal cell periphery by heating. On the other hand, if a shift distance becomes large, an elastic modulus of the pressure sensitive adhesive layer will become lower, which relaxes the stress of the optical film. Relaxation of this stress may satisfy optical function retentivity. Consequently, optical properties, such as optical transmittance and retardation, do not easily fall, and thereby generation of display irregularity on a periphery is suppressed, and furthermore, curvature of the liquid crystal cell may effectively be prevented. In the light of this stress relaxation property, in the present invention, it is preferable to set a shift distance in the creep test to no less than 100 μm, and preferably no less than 150 μm. In addition, if a shift distance becomes excessively large, a stringing phenomenon that a pressure sensitive adhesive is extended to show a shape of thread may occur on an optical film periphery at the time of durability test, that is, durability and optical property will fall, and therefore a shift distance is preferably no more than 10 mm.

In the pressure sensitive adhesive optical film, as pressure sensitive adhesive layers, a surface modified pressure sensitive adhesive layer in which functional groups and/or segments showing adhesive reactivity to a glass plate are chemically fixed is suitably used.

In the above-mentioned surface modified pressure sensitive adhesive layer, after attached to a glass plate, a pressure sensitive adhesive physically wets a surface of the glass plate and spreads to show a certain amount of initial adhesive strength, leading to demonstration of an outstanding reworkability. Moreover, functional groups and/or segments introduced into a surface of a surface modified pressure sensitive adhesive layer raise an adhesive strength with passage of time, and, finally realize a firm adhesion state. Thus, since the surface modified pressure sensitive adhesive layer is firmly adhered to a glass surface by a chemical reaction, even if heating and humidification processing is given, neither foaming nor peeling is generated, showing excellent moisture heat resistance.

The above-mentioned functional groups and/or segments showing adhesive reactivity to a glass plate preferably have at least one kind of functional group selected from silanol groups and alkoxy silyl groups.

A surface modified pressure sensitive adhesive layer to which alkoxy silyl groups and silanol groups are fixed has an adhesive strength enabling temporary attachment, and has a lowered surface adhesive property, demonstrating good reworkability. Besides, since alkoxy silyl groups and silanol groups chemically combine with silanol groups on a surface of a glass plate easily and realize a firm adhesion state as the time proceeds, and moisture heat resistance thereof improves. Improvement in adhesive strength by a reaction between alkoxy silyl groups or silanol groups, and silanol groups on a surface of a glass plate may be promoted by heating, whereas it proceeds by passage of time. Besides, conditions of heat-treatment may be appropriately determined in consideration of both of productivity of a liquid crystal cell, and damage by heat of an optical film. Temperatures are preferably in a range of approximately 60 through 100° C., and heating period is preferably in a range of approximately 1 through 12 hours.

A surface modification of the pressure sensitive adhesive layer may be performed by an interfacial contact reaction between a surface modified material having functional groups and/or segments showing adhesive reactivity to a glass plate and functional groups (b), and functional groups (a1) of the pressure sensitive adhesive layer, and/or functional groups (a2) of a reactive middle layer beforehand formed on a surface of the pressure sensitive adhesive layer.

Moreover, the present invention relates to a pressure sensitive adhesive for optical films forming a pressure sensitive adhesive layer of the pressure sensitive adhesive optical film.

A pressure sensitive adhesive for optical films of the present invention has outstanding reworkability and moisture heat resistance as mentioned above, and also has outstanding optical function retentivity. Besides, a pressure sensitive adhesive for optical films of the present invention may provide a pressure sensitive adhesive optical film having a same level of outstanding cutting processability and preservability, etc. as conventional materials.

Furthermore, the present invention relates to an image viewing display using the pressure sensitive adhesive optical film. A pressure sensitive adhesive optical film of the present invention may be used according to usage embodiment of various kinds of image viewing displays, such as liquid crystal displays, and, for example, it is used to be attached onto a glass substrate of a surface of a liquid crystal cell in liquid crystal displays.

DESCRIPTION OF THE PREFERRED EMBODIMENTS

Figure 1:
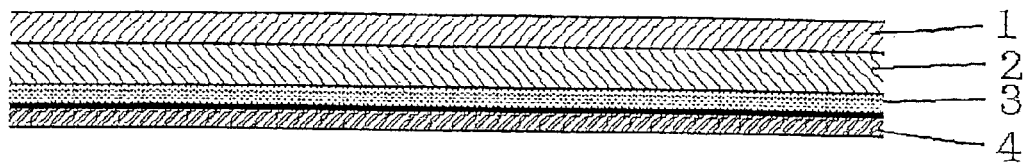
FIG. 1 is an example of a sectional view of an optical film of the present invention.

In a pressure sensitive adhesive for forming a pressure sensitive adhesive layer of a pressure sensitive adhesive optical film of the present invention, materials having outstanding optical transparency, satisfying the above-mentioned peel strength, and showing pressure sensitive adhesive properties, such as moderate wettability, moderate coagulation property, moderate adhesive property, etc., may be used without special limitation. Furthermore, materials satisfying a shift distance of the creep test are preferable. For example, pressure sensitive adhesives having polymers, such as acrylic based polymers, silicone based polymers, polyesters, polyurethanes, polyethers, and synthetic rubbers, as base polymers may be used. Among them, pressure sensitive adhesives having acrylic based polymers as base polymers, which are excellent in transparency, weatherability, heat resistance, etc., are preferably used.

As the above-mentioned acrylic based polymers, polymers that have (meth)acrylic acid alkyl esters having alkyl groups with average carbon numbers of 2 through 14 as a principal skeleton are preferable in order to demonstrate moderate wettability and flexibility. In addition, a term "(meth)acrylic acid alkyl ester" represents a term "acrylic acid alkyl ester" and/or "methacrylic acid alkyl ester", and it has a same meaning as (meth) in the present invention. As examples of alkyl group of (meth)acrylic acid alkyl esters; for example, ethyl group, n-propyl group, isopropyl group, n-butyl group, isobutyl group, isoamyl group, hexyl group, heptyl group, cyclo hexyl group, 2-ethyl hexyl group, iso-octyl group, iso-nonyl group, lauryl group, dodecyl group etc. may be mentioned. In these (meth)acrylic acids alkyl esters, one kind may be used independently, or two or more kinds may be used in combination.

In order to give coagulation property, adhesive property, and cross-linking reactivity as a pressure sensitive adhesive to the above-mentioned acrylic based polymers, various monomers may be copolymerized. Copolymerizable monomers may especially not be limited, but any kind of monomers may be used so long as they are copolymerizable with (meth)acrylic acid alkyl esters as the above-mentioned main ingredients.

As the copolymerizable monomer, monomers containing functional groups may be mentioned. Specifically, there may be mentioned: monomers containing hydroxyl groups, such as 2-hydroxyethyl(meth)acrylate, 2-hydroxypropyl(meth) acrylate, 4-hydroxybutyl(meth)acrylate, 6-hydroxyhexyl (meth)acrylate, 8-hydroxyoctyl(meth)acrylate, 10-hydroxydecyl(meth)acrylate, 12-hydroxylauryl(meth)acrylate, 4-hydroxymethylcyclohexyl methyl(meth)acrylate; monomers containing carboxyl groups, such as acrylic acid, methacrylic acid, carboxyethyl acrylate, carboxypentyl acrylate, itaconic acid, maleic acid, and crotonic acid; acid anhydride monomers, such as maleic anhydride and anhydrous itaconic acid; monomers containing sulfonic acid groups, such as 2-acrylamide-2-methylpropane sulfonic acid; monomers containing phosphoric acid groups, such as 2-hydroxyethyl acryloyl phosphate; monomers containing epoxy groups, such as glycidyl(meth)acrylate etc.

Furthermore, there may be mentioned as copolymerizable monomers: amide based monomers, such as (meth)acrylamide and N-substituted-(meth)acrylamide; maleimide based monomers, such as N-cyclohexyl maleimide, N-isopropyl maleimide, N-lauryl maleimide, and N-phenyl maleimide; itaconimide based monomers, such as N-methyl itaconimide, N-ethyl itaconimide, N-butyl itaconimide, N-octyl itaconimide, N-(2-ethylhexyl)itaconimide, N-cyclohexyl itaconimide, N-lauryl itaconimide; succinimide based monomers, such as N-(meth)acryloyloxymethylene succinimide, N-(meth)acryloyl-6-oxy-hexamethylene succinimide and N-(meth)acryloyl-8-oxy-octamethylene succinimide.

Furthermore, there may be mentioned: vinyl based monomers, such as vinyl acetate, N-vinyl pyrrolidone, N-vinyl carboxylic amide, and styrene; divinyl based monomers, such as divinylbenzene; diacrylate based monomers, such as 1,4-butyldiacrylate, 1,6-hexyldiacrylate; acrylic ester based monomers, such as glycidyl(meth)acrylate, tetrahydrofurfuryl(meth)acrylate, polyethyleneglycol(meth)acrylate, polypropyleneglycol(meth)acrylate, fluorine(meth)acrylate, silicone(meth)acrylate etc.; (meth)acrylic acid ester having different ester groups from the above-mentioned main ingredients, such as methyl(meth)acrylate, octadecyl(meth)acrylate, etc.

As the above-mentioned copolymerizable monomers, monomers containing carboxyl groups having functional groups reactive with below-mentioned intermolecular cross-linking agent, acid anhydride monomers, and monomers containing functional groups, such as glycidyl(meth)acrylate and monomers containing hydroxyl groups may be preferably used. The above-mentioned copolymerizable monomers are copolymerized by a percentage of no more than 10% by weight of monomers constituting the acrylic based polymers.

Moreover, when a post-cross-linking processing by irradiation of radioactive rays, such as electron ray, etc. is performed without addition of cross-linking agents to perform a cross-linking processing, multi-functional acrylate based monomers may be used. As multi-functional acrylate based monomers, for example, there may be mentioned: hexanediol di(meth)acrylate, (poly)ethyleneglycol di(meth) acrylate, (poly)propyleneglycol di(meth)acrylate, neopentylglycol di(meth)acrylate, pentaerythritol di(meth)acrylate, trimethylolpropane tri(meth)acrylate, pentaerythritol tri (meth)acrylate, dipentaerythritol hexa(meth)acrylate, epoxy acrylate, polyester acrylate, urethane acrylate, etc.

In preparation of acrylic based polymers, for example, proper methods, such as a solution polymerization method, an emulsion polymerization method, a bulk polymerization method, and a suspension polymerization method, may be applied to one kind or two or more kind of monomer mixtures of the above-mentioned monomers. In case of a bulk polymerization method, polymerization method by UV irradiation is preferably applied.

As acrylic based polymers, in view of moisture heat resistance etc. a polymer having a weight average molecular weight of no less than 100,000, preferably of no less than 200,000, and more preferably in a range of 400,000 through 2,000,000 is used.

In preparation of the above-mentioned acrylic based polymers, polymerization initiators are usually used. Although an amount used is suitably determined, in general it is 0.001 through 5% by weight of whole amount of monomers. As polymerization initiators, proper initiators, such as thermal polymerization initiators and photopolymerization initiators, may be used according to polymerization methods.

As thermal polymerization initiators, for example, there may be mentioned: organic peroxides, such as, benzoylperoxide, t-butyl perbenzoate, cumene hydroperoxide, diisopropyl peroxydicarbonate, di-n-propylperoxy dicarbonate, di(2-ethoxy ethyl)peroxy dicarbonate, t-butylperoxy neodecanoate, t-butyl peroxy pivalate, (3,5,5-trimethyl hexanoyl) peroxide, dipropionyl peroxide, diacetylperoxide etc. Moreover, there may be mentioned: azo based compounds etc., such as, 2,2'-azobisisobutyronitrile, 2,2'-azobis(2-methyl butyronitrile), 1,11-azobis(cyclohexane-1-carbonitrile), 2,2'-azobis(2,4-dimethyl valeronitrile), 2,2'-azobis(2,4-dimethyl-4-methoxyvaleronitrile), dimethyl-2,2'-azobis(2-methylpropionate), 4,4'-azobis(4-cyano valeric acid), 2,2-azobis(2-hydroxymethylpropionitrile), 2,2'-azobis[2-(2-imidazoline-2-yl)propane] etc.

As photopolymerization initiators, for example, there may be mentioned: acetophenone based initiators, such as, 4-(2-hydroxy ethoxy)phenyl(2-hydroxy-2-propyl)ketone, α-hydroxy-α,α'-dimethylacetophenone, methoxyacetophenone, 2,2-dimethoxy-2-phenylacetophenone, 1-hydroxycyclohexyl phenylketone, 2-methyl-1-[4-(methylthio)-phenyl]-2-morpholinopropane-1 etc.; benzoin ether based initiators, such as, benzoin ethyl ether, benzoin isopropyl ether etc. And also there may be mentioned: ketal based initiators, such as benzyl dimethyl ketal; benzophenone based initiators, such as, benzophenone, benzoylbenzoic acid, 3,3'-dimethyl-4-methoxybenzophenone etc.; thioxanthone based initiators, such as, thioxanthone, 2-chloro thioxanthone, 2-methylthioxanthone, 2,4-dimethylthioxanthone, isopropylthioxanthone, 2,4-dichlorothioxanthone, 2,4-diethyl thioxanthone, 2,4-diisopropylthioxanthone, etc.; and camphor quinone, halogenated ketone, acyl phosphinoxide, acyl phosphonate etc.

As other polymerization initiators, potassium persulfate, ammonium persulfate, hydrogen peroxide, etc., and redox based initiators in which the above-mentioned compounds and reducing agent are used together may be mentioned.

Intermolecular cross-linking agents may be blended with a pressure sensitive adhesive in formation of a pressure sensitive adhesive layer of the present invention. The intermolecular cross-linking agents are not especially limited, but are suitably selected and used according to types of functional groups included in a base polymer. As intermolecular cross-linking agents, for example, there may be mentioned: poly-functionnal isocyanate based cross-linking agents, such as tolylene diisocyanate, trimethylol propane tolylene diisocyanate, and diphenylmethane tri isocyanate; epoxy based cross-linking agents, such as polyethylene glycol diglycidyl ether, diglycidyl ether, and trimethylol propane tri glycidyl ether; and in addition, melamine resin based cross-linking agents, metal salt based cross-linking agents, metal chelate based cross-linking agents, amino resin based cross-linking agents, etc.

For example, additives added to pressure sensitive adhesive layers, such as resins of natural or synthetic products; fillers comprising glass fiber, glass beads, metal powders, other inorganic powders, etc., pigments, coloring agents, and antioxidants, may be suitably blended into pressure sensitive adhesives, if necessary. A pressure sensitive adhesive layer showing optical diffusibility may also be obtained by including fine-grains.

Application of a pressure sensitive adhesive layer to one side or both sides of an optical film may be performed using proper methods. For example, methods may be mentioned that a pressure sensitive adhesive is dissolved or dispersed in an independent or mixed solvent of plurality of solvents, such as toluene and ethyl acetate, and a pressure sensitive adhesive liquid having a concentration about 10 through 40% by weight is prepared, the liquid obtained is directly applied on an optical film using proper spreading methods, such as a flow casting method and a coating method; and that a pressure sensitive adhesive layer is formed on a separator according to the above-mentioned method, and thus formed layer is transferred to an optical film.

Pressure sensitive adhesive layers may also be formed on one side or both sides of an optical film as a superposed layer having different compositions or different types etc. When they are formed on both sides, a pressure sensitive adhesive layer having different compositions or different types may also be used on front side and back side of the optical film etc. A thickness of the pressure sensitive adhesive layer is suitably determined according to purposes of use etc., and, generally is in a range of 1 through 500 μm.

A pressure sensitive adhesive layer of a pressure sensitive adhesive optical film of the present invention may realize a surface modified pressure sensitive adhesive layer to which functional groups and/or segments showing adhesive reactivity to a glass plate are chemically fixed. Surface modification of the pressure sensitive adhesive layer may be performed by forming a thin surface modified layer using interfacial contact reaction. An interfacial contact reaction is a chemical reaction that occurs at an interface of a phase and another phase, and in the present invention, a chemical reaction is performed at an interface of a pressure sensitive adhesive layer (solid phase), and a material for surface modification (liquid phase or gaseous phase), leading to formation of a surface modified layer chemically fixed to the pressure sensitive adhesive surface.

When a pressure sensitive adhesive layer is surface-modified, functional groups (a1) being able to contribute to an interfacial contact reaction and having high reactivity are included beforehand in the pressure sensitive adhesive layer. As methods of making the functional group (a1) included in the pressure sensitive adhesive layer, for example, a method in which the functional group (a1) is chemically introduced into a base polymer by a copolymerization, a graft polymerization, etc. using a monomer including the functional group (a1), and a method in which a compound including the functional group (a1) is added in a pressure sensitive adhesive solution before coating, and then mixing is performed may be mentioned. And as functional groups (a1), functional groups included for the purpose of cross-linking of the pressure sensitive adhesive layer may be utilized.

As compounds including reactive functional groups (a1) used for the pressure sensitive adhesive layer, for example, isocyanate based compounds, such as tolylene diisocyanate (TDI) compounds, diphenylmethane-4,4-diisocyanate (MDI) compounds, and hexamethylene diisocyanate (HDI) compounds may be mentioned. These isocyanate based compounds also have an effect as cross-linking agents for the pressure sensitive adhesive layer, and are used preferably.

As materials for surface modification, compounds having functional groups and/or segments showing adhesive reactivity to a glass plates, and including functional groups (b)

with a high reactivity to functional groups (a1) in the pressure sensitive adhesive layer are used.

A material including functional groups (b) for surface modification performs an interfacial contact reaction in a state of liquid phase or of gaseous phase to a solid phase comprising the pressure sensitive adhesive layer including the above-mentioned functional group (a1), and thus fixation of a material for surface modification on a surface of the pressure sensitive adhesive is performed. Thereby, a state is realized where the material for surface modification is firmly combined with the pressure sensitive adhesive surface by chemical bonds, such as a covalent bond, a coordinate bond, a hydrogen bond, an ionic bond, or a metallic bond.

As combinations of the above-mentioned functional groups (a1) and functional groups (b) conducting an interfacial contact reaction, for example, there may be mentioned: (1) a combination of primary or secondary amino groups, and isocyanate groups, acid halide groups, epoxy groups, acid anhydride groups or carboxyl groups, (2) a combination of carboxyl groups and aziridine groups, (3) a combination of hydro silyl groups, and hydroxyl or vinyl groups, (4) a combination of epoxy groups and acid anhydride groups, and (5) a combination of acid halide groups or acid anhydride groups, and hydroxyl or mercapto groups.

As materials for surface modification including functional groups (b), compounds including functional groups (b) corresponding to functional groups (a1) included in a pressure sensitive adhesive layer, and including functional groups and/or segments showing an adhesive reactivity to a glass plate may be suitability selected. As functional groups and/or segments showing an adhesive reactivity to silanol groups on a surface of a glass plate, silanol groups and alkoxy silyl groups are suitably used.

When a functional group (a1) in a pressure sensitive adhesive layer is an isocyanate group, for example, as the above-mentioned materials for surface modification, compounds including primary amino groups, and including alkoxy silyl groups or silanol groups may be preferable. Specifically, amino based silane compounds, such as N-β-aminoethyl-γ-aminopropylmethyl trimethoxy silane, N-β-aminoethyl-γ-aminopropylmethyl dimethoxy silane, and γ-aminopropyl trimethoxy silane may be mentioned.

Surface modification of a pressure sensitive adhesive layer may be performed by an interfacial contact reaction between a functional group (a2) of a reactive middle layer beforehand formed on a surface of the pressure sensitive adhesive layer, and a functional group (b) of a material for surface modification.

Formation of a reactive middle layer may be performed by fixing compounds having functional groups (a2) reactive with functional groups (a1) of a pressure sensitive adhesive layer, using an interfacial contact reaction. As compounds having functional groups (a2), compounds not all of whose functional groups (a2) react by a reaction with functional group (a1) may be used. When a functional group (a1) of a pressure sensitive adhesive layer are an isocyanate group, compounds having primary or secondary amino groups as a functional group (a2) are preferable for high reactivity thereof as materials for formation of reactive middle layers. Compounds including primary or secondary amino groups are not especially limited, and polyethylene imines, polyvinyl amines, poly allylamines, etc. may be mentioned as suitable examples.

And further, an interfacial contact reaction is performed between functional groups (a2) of a reactive middle layer and functional groups (b) of a material for surface modification to perform an interfacial contact reaction. In this case, as materials for surface modification including functional groups (b), compounds including functional groups (b) corresponding to functional groups (a2) of a reactive middle layer, and including functional groups and/or segments showing adhesive reactivity to a glass plate are suitably selected. As functional groups and/or segments showing adhesive reactivity to silanol groups on a surface of a glass plate, silanol groups and alkoxy silyl groups are preferable.

When a functional group (a2) of a reactive middle layer is an amino group, as the above-mentioned materials for surface modification, for example, compounds including epoxy groups and including alkoxy silyl groups or silanol groups are preferable. Specifically, epoxy based silane compounds, such as γ-glycidoxy propyl trimethoxy silane, γ-glycidoxy propyl methyl diethoxy silane, β-3,4-epoxy cyclohexyl ethyl trimethoxy silane, may be preferably used.

As methods for reacting a liquid phase of materials for surface modification or materials for formation of a reactive middle layer to a solid phase of a pressure sensitive adhesive layer using an interfacial contact reaction, there may be mentioned methods, such as: a method in which both phases are contacted by dipping and immersion; a method in which a liquid phase is applied to a pressure sensitive adhesive layer using well-known application methods, such as roll coating, such as photogravure coating, kiss coating and the like, die coating, such as fountain coating, squeeze coating, and spin coating; and a method of atomization application by spraying etc. Besides, as methods for reacting a gaseous phase of materials for surface modification or materials for formation of a reactive middle layer to a solid phase of a pressure sensitive adhesive layer using an interfacial contact reaction, a method directly spraying a gaseous phase on a pressure sensitive adhesive layer, and a method placing a pressure sensitive adhesive layer in a chamber including a gaseous phase may be mentioned.

In order to introduce functional groups into a pressure sensitive adhesive layer surface in the high density using these methods, it is not preferable that media including materials for surface modification, or materials for formation of a reactive middle layer in a liquid phase or a gaseous phase dissolve or swell the pressure sensitive adhesive layer. When, for example, a pressure sensitive adhesive layer is formed with a acrylic based pressure sensitive adhesive, it is desirable to suitably select solvents, such as water, methanol, hexane, or heptane that does not dissolve or swell the pressure sensitive adhesive layer.

In a pressure sensitive adhesive optical film of the present invention, as shown in FIG. 1, a pressure sensitive adhesive layer 3 is provided to an optical film 2. A surface modification may be given to the surface of the pressure sensitive adhesive layer 3. In addition, a protective film 1 may be provided to the optical film 2, and a separator 4 may be provided to the pressure sensitive adhesive layer 3.

Films used for formation of a liquid crystal display etc. are used as the optical film 2, and types of the films are not especially limited. As optical films, for example, a polarizing film may be mentioned. Generally as a polarizing film (polarizing plate), films of types having a transparent protective film are used on one side or both sides of a polarizer.

Figure 2:
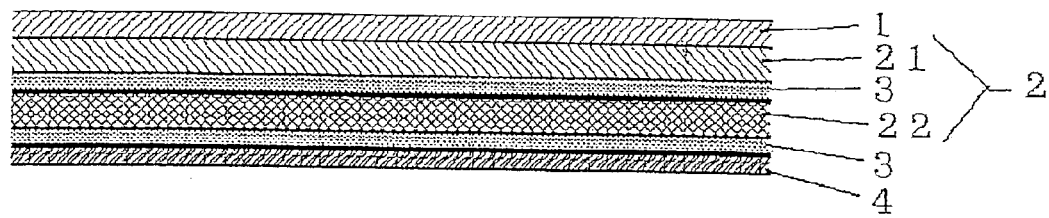
FIG. 2 is an example of a sectional view of other optical film of the present invention.

As an optical film 2, a retardation film, an elliptically polarizing film obtained by laminating a polarizing film and a retardation film, and a reflected type polarizing film may be used. In adhesion used for lamination in case of a laminated type optical film, in consideration of points, such as moisture heat resistance and optical function retentivity, a pressure sensitive adhesive layer in the present invention is preferable. FIG. 2 shows an example of a laminated film of a polarizing film 21 and a retardation film 22.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials (iodine, dyes) is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the protective film prepared in one side or both sides of the above-mentioned polarizer, with outstanding transparency, mechanical strength, heat stability, moisture cover property, isotropy, etc. may be preferable. As materials of the above-mentioned protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

In general, a thickness of a transparent protective film is 500 µm or more, preferably 1 through 300 µm, and especially preferably 5 through 200 µm.

As a transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the transparent protective film may have as little coloring as possible. Accordingly, a protective film having a phase difference value in a film thickness direction represented by $Rth=[(nx+ny)/2-nz]\times d$ of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protection film having a phase difference value (Rth) of −90 nm through +75 nm in a thickness direction. The phase difference value (Rth) in a thickness direction is preferably −80 nm through +60 nm, and especially preferably −70 nm through +45 nm.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

Adhesives are used for adhesion processing of the above described polarizing film and the transparent protective film. As adhesives, isocyanate derived adhesives, polyvinyl alcohol derived adhesives, gelatin derived adhesives, vinyl polymers derived latex type, aqueous polyesters derived adhesives, etc. may be mentioned.

An optical film of the invention may be used in practical use as a polarizing plate laminated with other optical layers. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarization plate may be used as elliptically polarization plate or circularly polarization plate on which the retardation plate is laminated. A description of the above-mentioned elliptically polarization plate or circularly polarization plate will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching high polymer materials, oriented films of liquid crystal polymers, and materials in which orientated layers of liquid crystal polymers are supported with films may be mentioned. Although a thickness of a retardation plate also is not especially limited, it is in general approximately 20 through 150 μm.

As high polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain skeleton, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidirectionally stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by NITTO DENKO CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

As a separator 4 material, papers, plastics films such as polyethylene polypropylene, rubber sheets, cloths, no woven fabrics, nets, foamed sheets and metallic foils or laminated sheets thereof may be used. As a surface of the separator 4, if necessary, suitable conventional release agents, such as silicone type, long chain alkyl type, fluorine type release agents, is coated.

An adhesive optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessity, lighting system, and by incorporating driving circuit. In the present invention, except that an adhesive optical film by the present invention is used, there is especially no limitation to use any conventional methods.

A pressure sensitive adhesive optical film of the present invention has flexibility, and may be easily applied to a curved surface or a large area surface, etc., and therefore it may be applied to proper type of liquid crystal cells, for example, active matrix driven type liquid crystal cells represented by a thin-film transistor type, and simple matrix driven type liquid crystal cells represented by a twist nematic type and a super twist nematic type etc. to form various types of liquid crystal displays.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

An optical film of the present invention may be used for proper uses, such as a formation of liquid crystal displays. A formation of liquid crystal displays may be attained by attaching an optical film by the present invention on one side or both sides of a liquid crystal cell via a pressure sensitive adhesive layer thereof. The attachment may be performed so that a polarizing film or a retardation film, etc. may be positioned to give a predetermined arrangement position, and the arrangement may be performed according to conventional methods.

Figure 3:
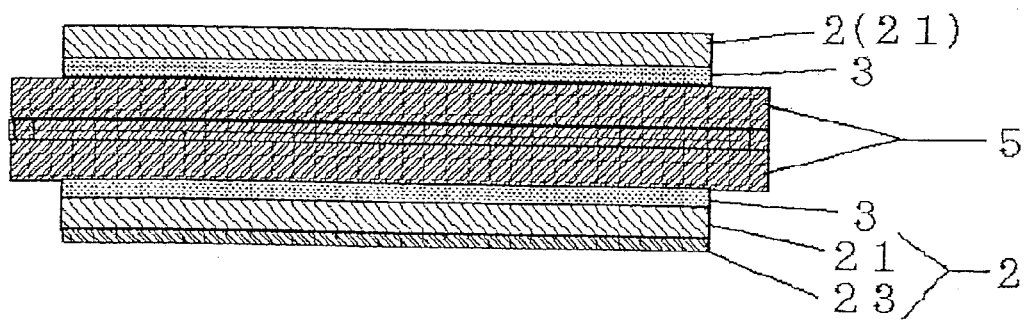
FIG. 3 is an example of a sectional view of a liquid crystal display.
Figure 4:
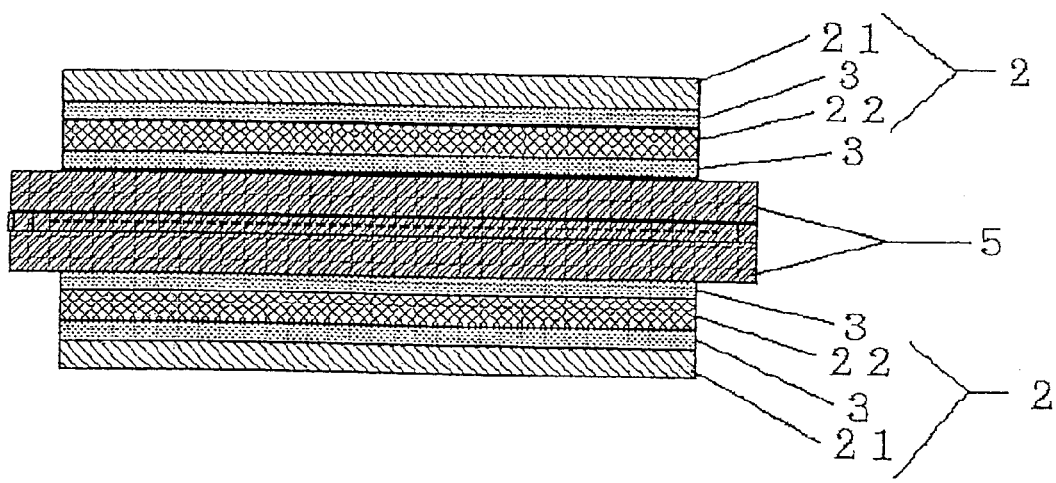
FIG. 4 is an example of a sectional view of other liquid crystal display.

FIG. 3 and FIG. 4 show an example of arrangement of an optical film in a liquid crystal display. Reference numeral 5 represents a liquid crystal cell and other symbols are according to the above-mentioned description. Besides, a device illustrated in FIG. 3 is a reflected type device in which a reflecting layer 23 is formed on a polarizing film 21, and as shown in this example, a reflecting layer is arranged on an outside of one side of a liquid crystal cell.

A device illustrated in FIG. 4 is a device using a retardation film 22. A retardation film is used in order to compensate a phase difference of a liquid crystal cell for the purpose of the prevention of coloring, expansion of a visual angle range and the like. In that case, it may also be used as an elliptically polarizing film obtained by laminating with a polarizing film.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLE

Although concrete description will be given hereinafter with reference to Examples of the present invention, the present invention is not limited to them. In addition, part represents part by weight in each example.

Example 1

(Preparation of an Acrylic Based Pressure Sensitive Adhesive)

Butyl acrylate 95 parts, acrylic acid 5 parts, and 2,2'-azobisisobutyronitrile 0.2 part were added with ethyl acetate 150 parts into a reaction vessel having a condenser tube, a nitrogen inlet tube, a thermometer, and an agitating device, reaction was performed under nitrogen gas current at 60° C. for 4 hours, and subsequently at 80° C. for 2 hours, and reaction was completed. Then, ethyl acetate 83 parts was added to a resulting reaction liquid to obtain an acrylic based polymer solution of 30% by weight of solid content concentration. Trimethylol propane tolylene diisocyanate 4 parts to solid content 100 parts was blended to thus obtained polymer solution, and an acrylic based pressure sensitive adhesive was obtained.

(Production of a Pressure Sensitive Adhesive Optical Film)

Next, the above-mentioned acrylic based pressure sensitive adhesive was applied onto a separator comprising a polyester film, and heat-treated for 3 minutes at 100° C., and a pressure sensitive adhesive layer having a thickness of 23 μm was formed. Subsequently, the separator thus obtained having the pressure sensitive adhesive layer was attached on a polarizing film (manufactured by NITTO DENKO CORP., NPF-SEG5425DU), and a pressure sensitive adhesive optical film was produced.

(Formation of a Reactive Middle Layer)

Immediately after production of the pressure sensitive adhesive optical film, the separator was separated, and subsequently the pressure sensitive adhesive optical film was immersed into an aqueous solution of poly allylamine 0.02% by weight (molecular weight approximately 10,000; manufactured by Nitto Boseki Co., Ltd. "PAA-10C") for 1 minute. This film was drawn up vertically at a rate of 40 mm/min, and a surface thereof was naturally dried at room temperature to obtain an optical film having a pressure sensitive adhesive layer with primary amino groups fixed onto the surface thereof.

(Formation of a Surface Modified Pressure Sensitive Adhesive Layer)

Furthermore, this pressure sensitive adhesive optical film was immersed into a hexane solution of γ-glycidoxy propyl trimethoxy silane (manufactured by Shin-Etsu Chemical Co., Ltd. "KBM403") 0.2% by weight for 10 minutes. This film was drawn up vertically at a rate of 40 mm/min, and a surface was naturally dried at room temperature to obtain an optical film that had a pressure sensitive adhesive layer to which alkoxy silyl groups, or silanol groups obtained by hydrolysis thereof were being fixed on a top surface of the pressure sensitive adhesive layer.

Example 2

Except for having used an aqueous solution of polyethylene imine ("Epomine SP-200" manufactured by NIPPON SHOKUBAI Co., Ltd.) 0.02% by weight instead of an aqueous solution of poly allylamine 0.02% by weight in (formation of a reactive middle layer) in Example 1, same operation as in Example 1 was repeated, and an optical film having a pressure sensitive adhesive layer with a primary, secondary and tertiary amino groups fixed onto a surface thereof was obtained. Subsequently, same operation as in (formation of surface modified pressure sensitive adhesive layer) in Example 1 was repeated, an optical film that had a pressure sensitive adhesive layer to which alkoxy silyl groups, or silanol groups obtained by hydrolysis thereof were being fixed on a top surface of the pressure sensitive adhesive layer was obtained.

Example 3

(Preparation of Acrylic Based Pressure Sensitive Adhesive)

Into a reaction vessel having a condenser tube, a nitrogen inlet tube, a thermometer, and an agitating device, 2-ethyl hexyl acrylate 100 parts, acrylic acid 2 parts, and 2,2'-azobisisobutyronitrile 0.2 part were added with ethyl acetate 150 parts, reaction was performed under nitrogen gas current at 60° C. for 4 hours, and subsequently at 80° C. for 2 hours, and reaction was completed. Then, ethyl acetate 83 parts was added to a resulting reaction liquid to obtain an acrylic based polymer solution of 30% by weight of solid content concentration. Trimethylol propane tolylene diisocyanate 1 part to solid content 100 parts was blended to thus obtained polymer solution, and an acrylic based pressure sensitive adhesive was obtained.

Subsequently, same operations as in (production of pressure sensitive adhesive optical film), (formation of a reactive middle layer), and (formation of surface modified pressure sensitive adhesive layer) in Example 1 were repeated, an optical film that had a pressure sensitive adhesive layer to which alkoxy silyl groups, or silanol groups obtained by hydrolysis thereof were being fixed on a top surface of the pressure sensitive adhesive layer was obtained.

Comparative Example 1

A pressure sensitive adhesive optical film to which surface modification was not given obtained in Example 1 (production of pressure sensitive adhesive optical film) was used.

Comparative Example 2

In (production of pressure sensitive adhesive optical film) in Example 1, same operation as in Example 1 was repeated except having used the acrylic based pressure sensitive adhesive obtained in Example 3. A pressure sensitive adhesive optical film thus obtained to which surface modification was not given was used.

Example 4

(Preparation of an Acrylic Based Pressure Sensitive Adhesive)

Into a reaction vessel having a condenser tube, a nitrogen inlet tube, a thermometer, and an agitating device, 2-ethyl hexyl acrylate 99.8 parts, 2-hydroxyethyl acrylate 0.2 part, and 2,2'-azobisisobutyronitrile 0.5 part were added with ethyl acetate 120 parts, and reaction was performed under nitrogen gas current at 60° C. for 4 hours, and subsequently at 70° C. for 2 hours, and reaction was completed. Then, ethyl acetate 114 parts was added to a resulting reaction liquid to obtain an acrylic based polymer solution of 30% by weight of solid content concentration. Trimethylol propane tolylene diisocyanate 0.1 part to solid content 100 parts was blended to thus obtained polymer solution, and an acrylic based pressure sensitive adhesive was obtained.

(Production of a Pressure Sensitive Adhesive Optical Film)

Next, the above-mentioned acrylic based pressure sensitive adhesive was applied onto a separator comprising a polyester film, and heat-treated for 5 minutes at 150° C., and a pressure sensitive adhesive layer having a thickness of 23 μm was formed. Subsequently, the separator thus obtained having the pressure sensitive adhesive layer was attached on a polarizing film (manufactured by NITTO DENKO CORP., NPF-SEG5425DU), and a pressure sensitive adhesive optical film was produced.

(Formation of a Reactive Middle Layer)

Immediately after production of the pressure sensitive adhesive optical film, the separator was separated, and subsequently the pressure sensitive adhesive optical film was immersed in an aqueous solution of poly allylamine 0.02% by weight (molecular weight approximately 10,000; manufactured by Nitto Boseki Co., Ltd. "PAA-10C") for 1 minute. This film was drawn up vertically at a rate of 40 mm/min, and a surface thereof was naturally dried at room temperature to obtain an optical film having a pressure sensitive adhesive layer with primary amino groups fixed onto the surface thereof.

(Formation of a Surface Modified Pressure Sensitive Adhesive Layer)

Furthermore, this pressure sensitive adhesive optical film was immersed into a hexane solution of γ-glycidoxy propyl trimethoxy silane (manufactured by Shin-Etsu Chemical Co., Ltd. "KBM403") 0.2% by weight for 10 minutes. This film was drawn up vertically at a rate of 40 mm/min, then a surface was naturally dried at room temperature to obtain an optical film that had a pressure sensitive adhesive layer to which alkoxy silyl groups, or silanol groups obtained by hydrolysis thereof were being fixed on a top face of the pressure sensitive adhesive layer.

Example 5

(Preparation of an Acrylic Based Pressure Sensitive Adhesive)

Butyl acrylate 95 parts, acrylic acid 5 parts, and 2,2'-azobisisobutyronitrile 0.2 part were added with ethyl acetate 150 parts into a reaction vessel having a condenser tube, a nitrogen inlet tube, a thermometer, and an agitating device, and reaction was performed under nitrogen gas current at 60° C. for 4 hours, and subsequently at 80° C. for 2 hours, and reaction was completed. Then, ethyl acetate 83 parts was added to a resulting reaction liquid to obtain an acrylic based polymer solution of 30% by weight of solid content concentration. Trimethylol propane tolylene diisocyanate 1 part to solid content 100 parts was blended to thus obtained polymer solution, and an acrylic based pressure sensitive adhesive was obtained.

Subsequently, same operations as in (production of pressure sensitive adhesive optical film), (formation of a reactive middle layer), and (formation of surface modified pressure sensitive adhesive layer) in Example 4 were repeated, an optical film that had a pressure sensitive adhesive layer to which alkoxy silyl groups, or silanol groups obtained by hydrolysis thereof were being fixed on a top surface of the pressure sensitive adhesive layer was obtained.

Example 6

(Preparation of an Acrylic Based Pressure Sensitive Adhesive)

Butyl acrylate 94.9 parts, acrylic acid 5 parts, and 2-hydroxyethyl acrylate 0.1 part and 2,2'-azobisisobutyronitrile 0.2 part were added with ethyl acetate 150 parts into a reaction vessel having a condenser tube, a nitrogen inlet tube, a thermometer, and an agitating device, reaction was performed under nitrogen gas current at 60° C. for 4 hours, and subsequently at 80° C. for 2 hours, and reaction was completed. Then, ethyl acetate 83 parts was added to a resulting reaction liquid to obtain an acrylic based polymer solution of 30% by weight of solid content concentration. Trimethylol propane tolylene diisocyanate 1 part to solid content 100 parts was blended to thus obtained polymer solution, and an acrylic based pressure sensitive adhesive was obtained.

Subsequently, same operations as in (production of pressure sensitive adhesive optical film), (formation of a reactive middle layer), and (formation of surface modified pressure sensitive adhesive layer) in Example 4 were repeated, and an optical film that had a pressure sensitive adhesive layer to which alkoxy silyl groups, or silanol groups obtained by hydrolysis thereof were being fixed on a top surface of the pressure sensitive adhesive layer was obtained.

Comparative Example 3

In (production of a pressure sensitive adhesive optical film) in Example 4, same operation as in Example 4 was repeated except having used acrylic based pressure sensitive adhesive obtained in Example 5. A pressure sensitive adhesive optical film thus obtained to which surface modification was not given was used.

Following evaluations were performed for pressure sensitive adhesive optical films obtained in Examples and Comparative examples. Table 1 and Table 2 show results.

(Adhesive Strength Evaluation)

A pressure sensitive adhesive optical film was cut out by 25 mm width, then it was attached onto a glass plate (alkali free glass), and an autoclave treatment was given under conditions for 50° C.×5 atm×15 minutes. The $P_0$ of initial 90° peel adhesive strength to a glass plate was measured immediately after the autoclave treatment under conditions of a temperature of 23° C., a peeling speed of 300 mm/minute. An annealing treatment of 2 hours was further given at 80° C. after the same autoclave treatment, and then the $P_1$ of 90° peel adhesive strength to a glass plate after heating was measured under conditions of a temperature of 23° C., a peeling speed of 300 mm/minute. Table 1 shows ratios ($P_1/P_0$) of $P_0$ and $P_1$. Adhesive strength was measured according to JIS Z0237.

(Creep Test)

A pressure sensitive adhesive optical film was attached on a glass plate (alkali free glass) by an attachment area of 10 mm×10 mm, and subsequently, 4.9N load was applied in a shearing direction in 23° C. ambient atmosphere for 1 hour. A shift distance (μm) of the pressure sensitive adhesive layer at that time was measured.

(Heat Resistance)

A pressure sensitive adhesive optical film (size 15 inch, and so forth) was attached on a glass plate (alkali free glass), then was heated in 90° C. ambient atmosphere for 500 hours, and, subsequently existence of foaming and peeling was visually observed.

(Moisture Resistance)

A pressure sensitive adhesive optical film was attached on a glass plate (alkali free glass), then was heated in 60° C. and 90% RH ambient atmosphere for 500 hours, and, subsequently existence of foaming and peeling was visually observed.

(Evaluation of Display Irregularity on Periphery)

Two of pressure sensitive adhesive optical films were attached on both sides of a glass plate (alkali free glass) so that absorption axes of polarizing films in the films on front and reverse side may perpendicularly intersect to each other, then was heated in 90° C. ambient atmosphere for 15 hours, and subsequently, a state of leaking of light on a film periphery on a backlight was visually observed based on following criteria.
0: no leaking of light
Δ: leaking of light slightly observed, but practically satisfactory
x: leaking of light observed, practically disadvantageous

TABLE 1

| | Adhesive strength to a glass plate (N/25 mm) | | |
|---|---|---|---|
| | $P_0$ | $P_1$ | $P_1/P_0$ |
| Example 1 | 0.5 | 25 | 50 |
| Example 2 | 1 | 25 | 25 |
| Example 3 | 0.5 | 20 | 40 |
| Comparative example 1 | 10 | 16 | 1.6 |
| Comparative example 2 | 7 | 12 | 1.7 |
| Example 4 | 0.5 | 20 | 40 |
| Example 5 | 1 | 24 | 24 |
| Example 6 | 1 | 25 | 25 |
| Comparative example 3 | 5 | 7 | 1.4 |

TABLE 2

| | Heat resistance | | Moisture resistance | | Creep test | Polarization irregularity on a |
|---|---|---|---|---|---|---|
| | Foaming | Peeling | Foaming | Peeling | (μm) | periphery |
| Example 1 | not observed | not observed | not observed | not observed | 50 | x |
| Example 2 | not observed | not observed | not observed | not observed | 50 | x |
| Example 3 | not observed | not observed | not observed | not observed | 120 | Δ |
| Comparative example 1 | not observed | not observed | not observed | not observed | 50 | x |
| Comparative example 2 | observed | observed | not observed | observed | 120 | Δ |
| Example 4 | not observed | not observed | not observed | not observed | 300 | ○ |
| Example 5 | not observed | not observed | not observed | not observed | 100 | Δ |
| Example 6 | not observed | not observed | not observed | not observed | 50 | x |
| Comparative example 3 | observed | not observed | not observed | not observed | 300 | ○ |

Pressure sensitive adhesive optical films of the present invention show that the $P_0$ of initial 90° peel strength is no more than 5 N/25 mm, which shows outstanding reworkability, as shown in Table 1. In addition, a ratio ($P_1/P_0$) of 90° peel strength $P_1$ after heating to the above-mentioned $P_0$ shows no less than 2, and also in a heated and humidified ambient atmosphere foaming and peeling may hardly occur, and outstanding moisture heat resistance is shown. Samples having a shift distance of no less than 100 μm in crepe test also show excellent stress relaxation property, and deterioration in optical property, especially display irregularity on a periphery is hardly shown. Furthermore, they are excellent in curvature prevention of a liquid crystal cell. Thus, according to a pressure sensitive adhesive optical film of the present invention, a liquid crystal display that has high quality and is excellent in durability may be obtained.

What is claimed is:
1. A pressure sensitive adhesive optical film comprising:
an optical film; and
a pressure sensitive adhesive layer laminated on at least one surface of the optical film, said pressure sensitive adhesive layer having a modified surface opposite to the laminated surface, said modified surface comprising functional groups and/or segments chemically fixed thereto, said functional groups and/or segments having adhesive reactivity to a glass plate,
wherein the pressure sensitive adhesive optical film satisfies:

$P_0 \leq 5 N/25$ mm; $P_1/P_0 \geq 2$, wherein $P_0$ is an initial 90° peel strength at a peeling speed of 300 mm/minute at 23° C. as measured when the pressure sensitive adhesive layer is attached on a glass plate, given an autoclave processing under conditions of 50° C., 5 atm, and 15 minutes, and left in 23° C. ambient atmosphere for 30 minutes, and $P_1$ is an after-heating 90° peel strength at a peeling speed of 300 mm/minute at 23° C. as measured when the pressure sensitive adhesive layer is given the autoclave processing, and further given a heat-treatment at 80° C. for 2 hours, and left in 23° C. ambient atmosphere for 30 minutes, wherein the pressure sensitive adhesive optical film is characterized as having a shift distance in a creep test of no less than 100 μm as measured when the pressure sensitive adhesive layer is attached by an attachment area 10 mm ×10 mm to a glass plate, and a load of 4.9 N is applied to the glass plate in a shearing direction for 1 hour, and subsequently the shift distance of the pressure sensitive adhesive layer is measured, wherein said modified surface is obtained by an interfacial contact reaction between a surface modified material and a compound having a functional group, said surface modified material being selected from compounds including epoxy groups and including alkoxy silyl groups or silanol groups, said compound having a functional group being selected from compounds having primary or secondary amino groups, wherein said pressure sensitive adhesive layer comprises a pressure sensitive adhesive main layer and a reactive middle layer formed thereon, said reactive middle layer having said modified surface and containing said compound having a functional group.

2. The pressure sensitive adhesive optical film according to claim 1, wherein said modified surface is obtained by an interfacial contact reaction between a surface modified material and a compound having a functional group, said surface modified material being selected from compounds including primary amino groups and including alkoxy silyl groups or silanol groups, said compound having a functional group being selected from isocyanate compounds.

3. The pressure sensitive adhesive optical film according to claim 1, wherein said surface modified material is selected from the group consisting of N-β-aminoethyl-γ-aminopropylmethyl trimethoxy silane, N-β-aminoethyl-γ-aminopropylmethyl dimethoxy silane, and γ-aminopropyl trimethoxy silane, and said compound having a functional group being selected from the group consisting of tolylene diisocyanate (TDI) compounds, diphenylmethane-4,4-diisocyanate (MDI) compounds, and hexamethylene diisocyanate (HDI) compounds.

4. The pressure sensitive adhesive optical film according to claim 1, wherein said surface modified material is selected from the group consisting of γ-glycidoxy propyl trimethoxy silane, γ-glycidoxy propyl methyl diethoxy silane, and β-3,4-epoxy cyclohexyl ethyl trimethoxy silane, and said compound having a functional group being selected from the group consisting of polyethylene imines, polyvinyl amines, and poly allylamines.

5. An image viewing display comprising a substrate and the pressure sensitive adhesive optical film of any of claims 2, 3, 1, or 4 attached thereto.

* * * * *